United States Patent [19]
Debuigne et al.

[11] Patent Number: 5,500,041
[45] Date of Patent: Mar. 19, 1996

[54] COMPOSITION FOR PREPARATION OF ARTICLES OF CALCIUM OXIDE

[75] Inventors: Jean Debuigne, Chantepie; Serge Prigent, Rennes, both of France

[73] Assignees: Institut National des Science Appliquees de Rennes, Rennes; Microsteel S.A., Vern Sur Seiche, both of France

[21] Appl. No.: 128,569

[22] Filed: Sep. 30, 1993

[30] Foreign Application Priority Data

Oct. 1, 1992 [FR] France ................... 92 11650

[51] Int. Cl.⁶ ........................................... B28B 7/36
[52] U.S. Cl. ................ 106/38.22; 106/38.2; 106/461; 106/471; 427/133; 427/134; 501/123; 501/125
[58] Field of Search ................ 106/38.2, 38.22, 106/461, 471; 501/123, 125; 427/133, 134

[56] References Cited

U.S. PATENT DOCUMENTS

| | | | |
|---|---|---|---|
| 4,108,931 | 8/1978 | Ogden | 264/37 |
| 4,269,256 | 5/1981 | Nakazawa et al. | 164/16 |
| 4,320,137 | 3/1982 | Paioni | 424/274 |
| 4,504,313 | 3/1985 | Robertson | 106/38.2 |

OTHER PUBLICATIONS

CA 112:38817 of EP 332789, Gillot et al., "Filter membrane and process for its preparation", Sep. 20, 1989.

Search Report for French Application No. 92.11650.

*Primary Examiner*—Mark L. Bell
*Assistant Examiner*—Scott L. Hertzog
*Attorney, Agent, or Firm*—Armstrong, Westerman, Hattori, McLeland & Naughton

[57] ABSTRACT

A composition for the preparation of articles of calcium oxide, comprising calcined calcium oxide and an organic phase consisting of at least one polyol in an anhydrous medium. The composition may be used to form linings for molds and crucibles intended to come into contact with molten metals of groups IV and V of the periodic table.

15 Claims, No Drawings

COMPOSITION FOR PREPARATION OF ARTICLES OF CALCIUM OXIDE

The present invention pertains to a composition for making articles of calcium oxide, as well as articles made therefrom and a method of preparation of such articles.

The use of lime, that is calcium oxide or CaO, to form the internal wall of molds or foundry crucibles used in molding titanium and alloys thereof has already been proposed. For example, one reference on the subject is the article by T. Degawa, K. Kamata and Y. Yoneda, "Melting and precision casting of pure titanium using calcia", 6th World Conference on Titanium, Vol. II, 1988, Cannes (France), pages 707–713.

The problem in using calcium oxide for such an application is that this material is hygroscopic and is very difficult to sinter. The sintering step requires either a high temperature or the addition of silica or phosphate which promote bonding of the grains to each other but cause superficial contamination of the titanium by silicon and oxygen, which in turn requires that the molded articles be subjected to chemical cleaning upon removal from the mold. Similar disadvantages are encountered when entire articles, as opposed to a lining only, are made from pure calcium oxide. The same problems also exist when the articles are used in contact with other metals belonging to the same group of the periodic table as titanium, that is zirconium and hafnium, as well as metals of group V, that is vanadium, niobium and tantalum.

One object of the present invention is to provide a composition which makes possible the production of articles of calcium oxide, and particularly the production of linings for molds or crucibles which are meant to come into contact with a molten metallic material selected from the group consisting of metals of group IV and group V of the periodic table of elements and alloys of those metals, which composition is free of the above-described disadvantages of known compositions.

Another object is to provide a composition of this type which is economical and easy to work, making it possible in particular to obtain molds which can be produced without significant shrinkage which would cause breakage of the mold and/or dimensional variations incompatible with precision molding, and from which moldings can be removed easily.

According to the invention, the above-mentioned objects as well as other objects which will be evident hereinafter, such as achieving great flexibility of use, total lack of toxicity and a zero reject rate, are met by a composition which contains calcined calcium oxide and an organic phase consisting of at least one polyol in a non-aqueous medium.

It turns out, surprisingly, that after drying and sintering this composition gives calcium oxide bodies having the same purity as the original calcined calcium oxide. When linings for foundry molds and crucibles are prepared from the composition of the invention, the linings and crucibles can come into contact with molten titanium, or other molten metals from groups IV and V of the periodic table of elements, without resulting in significant contamination of the metal. The lack of adherence of the metal to the mold or crucible enables the preparation of pieces having excellent surface properties. Furthermore, the properties of the composition are such that it is possible to preheat significantly the mold, which is very advantageous in the molding of small pieces and thin films with or without the application of centrifugal force.

Without being bound in any way to a particular theory, it is believed that the advantageous effects of the invention are due, in particular, to the formation of a solid alkoxide by reaction of the polyol with the calcium oxide, which causes a setting phenomenon in the drying step.

Preferably, the polyol present in the composition of the invention is a trihydric or dihydric alcohol which is liquid at room temperature, and is preferably selected from the group consisting of glycerol and diethylene glycol for reasons of cost and availability.

It is preferred that the polyol be present in the composition of the invention in the amount of 1 to 20% by volume on the basis of the non-aqueous medium, or more preferably, approximately 10% on the basis of the non-aqueous medium.

The non-aqueous medium is preferably a monohydric alcohol which is liquid at ambient temperature. Propanol is a preferred monohydric alcohol because of its favorable evaporation rate, as a result of which only a short duration is required for the above-mentioned drying step.

It is preferable to use the calcined calcium oxide in the composition of the invention in the amount of 0.5 to 3 kg per liter of the non-aqueous medium, with a preferred grain size in the range from 50 to 2,000 µm. The grain size is selected in view of the desired end-use, and affects particularly the surface properties of the layers coming into contact with the molten metal.

When the composition of the invention is used to cover a foundry mold with a lining intended to come in contact with molten titanium, for example, the composition is applied in liquid form by a coating method and is allowed to dry for at least approximately one hour at ambient temperature. Then one or more additional layers are applied, each layer being subjected to drying for at least approximately one hour at room temperature, followed by sintering for at least approximately one hour at a temperature from 800° to 1,500° C.

For producing a crucible, layers of the composition according to the invention are applied to a lost wax model, for example by simple immersion, and after a drying step which results in an already sufficient consistency for the article for the above-mentioned reasons, flash dewaxing is carried out at a temperature from 900° to 1,100° C. This operation is followed by the sintering step described above.

In the dewaxing step, pre-sintering takes place as well as decomposition by oxidation of the alkoxide formed by the above-mentioned reaction between calcium oxide and the polyol. The morphology of the CaO which is then obtained makes possible sintering at a temperature of only approximately 1,450° C., which results in a calcium oxide ceramic having approximately the same purity as the purity of the original calcined calcium oxide.

It should be noted that numerous additives such silica, magnesia, alumina, thoria, yttria, zirconia or stabilized zirconia-based solid solutions may be incorporated in the composition of the invention. Thus it is possible to obtain hollow or solid ceramic pieces which can be sintered at a temperature lower than would be necessary if known processes were used. The above-mentioned setting phenomenon makes possible the easy and economical fabrication of numerous articles of technology.

In making the molds it is also always possible to use reinforcing layers made by conventional processes for fabrication by the lost wax process, using non-aqueous baths.

The step of unmolding from these molds is particularly easy since hydrolysis is sufficient for destroying the mold, without having to use conventional methods such as polishing. The action of water at room temperature on the calcium oxide mold causes its disintegration, without causing deformation or alteration of the surface of the moldings.

An embodiment of the use of the composition of the invention for fabricating crucibles for holding molten titanium is described below.

35 kg of calcined calcium oxide having a grain size of less than 50 µm and 2.5 liter of glycerol were added to 25 liters of propanol-2. A wax model was prepared and immersed in this composition for 15 seconds, and subsequently subjected to polishing with calcium oxide having a grain size of from 200 to 500 µm, followed by drying at room temperature for two hours.

A second layer was then applied by immersion in the composition for 5 seconds. Polishing was carried out with calcium oxide having a grain size in the range from 0.5 to 1 mm, and the duration of the drying step was also two hours.

As a final step, a third layer was applied in the same manner as the second layer.

The resulting product was subjected to flash dewaxing in an oven at approximately 1,000° C., followed by sintering for approximately two hours at a temperature around 1,450° C.

Titanium melts were tested in the crucibles thus obtained and preheated at 1,200° C. The crucibles were kept at this temperature for approximately ten minutes after the introduction of the titanium melts, then allowed to cool in an atmosphere of purified argon. The obtained test samples did not exhibit any α phase in surface, and had a Vickers hardness which was an indication that they contained no contamination.

We claim:

1. A composition for the preparation of articles of calcium oxide, comprising calcined calcium oxide and an organic phase consisting essentially of at least one polyol in a non-aqueous medium, wherein said calcined calcium oxide is present in the amount from 0.5 to 3 kg per liter of the non-aqueous medium.

2. A composition according to claim 1, wherein said polyol is a trihydric or dihydric alcohol which is liquid at room temperature.

3. A composition according to claim 1, wherein said polyol is one selected from the group consisting of glycerol and ethylene glycol.

4. A composition according to claim 1, wherein said polyol is present in the amount of 1 to 20% by volume based on the non-aqueous medium.

5. A composition according to claim 4, wherein said polyol is present in the amount of 10% by volume based on the non-aqueous medium.

6. A composition according to claim 1, wherein said non-aqueous medium is a monohydric alcohol.

7. A composition according to claim 6, wherein said monohydric alcohol is propanol.

8. A composition according to claim 1, wherein said calcined calcium oxide has a grain size from 50 to 2,000 µm.

9. A composition according to claim 1, which further comprises at least one additive selected from the group consisting of silica, magnesia, alumina, thoria, yttria, zirconia, and stabilized zirconia-based solid solutions.

10. A process for covering a foundry mold with a lining intended to come in contact with molten titanium, comprising the steps of:

applying to the foundry mold at least one layer of a composition comprising calcined calcium oxide and an organic phase consisting essentially of at least one polyol in a non-aqueous medium, wherein said calcined calcium oxide is present in the amount from 0.5 to 3 kg per liter of the non-aqueous medium in liquid form by a coating method;

drying each applied layer for at least approximately one hour at ambient temperature before applying a new layer; and sintering after the last drying step for at least approximately one hour at a temperature from 800° to 1,500° C.

11. A process according to claim 10, wherein at least one reinforcing layer made by lost wax process using anhydrous baths is introduced in at least one said step of applying a layer of said composition.

12. A process according to claim 10, further comprising a step in which the lining is subsequently destroyed by hydrolysis.

13. A process for producing a crucible comprising the steps of:

applying at least one layer of a composition comprising calcined calcium oxide and an organic phase consisting essentially of at least one polyol in a non-aqueous medium, wherein said calcined calcium oxide is present in the amount from 0.5 to 3 kg per liter of the non-aqueous medium to a lost wax model;

drying the applied layer;

flash dewaxing at a temperature from 900° to 1,100° C. after the drying step; and sintering for at least approximately one hour at a temperature form 800 to 1,500° C.

14. A process according to claim 13, wherein at least one reinforcing layer made by lost wax process using anhydrous baths is introduced in at least one said step of applying a layer of said composition.

15. A process according to claim 13, further comprising a step in which the lining is subsequently destroyed by hydrolysis.

* * * * *